United States Patent
Hong et al.

(10) Patent No.: US 9,640,807 B2
(45) Date of Patent: May 2, 2017

(54) INTEGRATED FLUORINE GASKET MANUFACTURED BY INJECTION MOLDING FOR HYDROGEN FUEL CELLS

(71) Applicants: Hyundai Motor Company, Seoul (KR); Donga Manufacturing Corp., Ansan, Gyeonggi-Do (KR); E.I. Du Pont De Nemours and Company, Wilmington, DE (US)

(72) Inventors: Bo Ki Hong, Seoul (KR); Byeong Heon Jeong, Gyeonggi-do (KR); Seung Kyung Ko, Gyeonggi-do (KR); Stephen Bowers, Le Grand Sacconex (CH); Ho Jin Lee, Incheon (KR); Yoon Gue Choi, Gyeonggi-do (KR)

(73) Assignees: Hyundai Motor Company, Seoul (KR); Donga Manufacturing Corp., Ansan, Gyeonggi-do (KR); E.I. Du Pont De Nemours and Company, Wilmington, DE (US)

( * ) Notice: Subject to any disclaimer, the term of this patent is extended or adjusted under 35 U.S.C. 154(b) by 914 days.

(21) Appl. No.: 13/715,552

(22) Filed: Dec. 14, 2012

(65) Prior Publication Data
US 2014/0077462 A1    Mar. 20, 2014

(30) Foreign Application Priority Data
Sep. 17, 2012 (KR) .......... 10-2012-0102744

(51) Int. Cl.
B32B 15/06 (2006.01)
B32B 25/04 (2006.01)
(Continued)

(52) U.S. Cl.
CPC ........... *H01M 8/0284* (2013.01); *B32B 15/06* (2013.01); *B32B 25/04* (2013.01); *B32B 25/14* (2013.01);
(Continued)

(58) Field of Classification Search
None
See application file for complete search history.

(56) References Cited

U.S. PATENT DOCUMENTS 4,501,858 A * 2/1985 Moggi .......................... 525/340
4,612,351 A * 9/1986 Caporiccio et al. .......... 525/199
(Continued)

FOREIGN PATENT DOCUMENTS

| CN | 101361214 A | 2/2009 |
| CN | 101536239 A | 9/2009 |

(Continued)

OTHER PUBLICATIONS

"Dupont Viton Selection Guide" (Jul. 2010).*
(Continued)

*Primary Examiner* — Vivian Chen
(74) *Attorney, Agent, or Firm* — Mintz Levin Cohn Ferris Glovsky and Popeo, P.C.; Peter F. Corless

(57) ABSTRACT

Disclosed is an integrated fluorine gasket manufactured by injection molding for hydrogen fuel cells. In particular, a fluorine compound having a fluorine content of about 60 to 75 parts by weight based on 100 parts by weight of a fluoroelastomer is disposed in a gasket. The resulting fluorine gasket is integrated with a thin bipolar plate having a thickness of about 200 μm or less to have a thickness of about 750 μm or less by injection molding on the thin bipolar plate and by cross-linking.

12 Claims, 13 Drawing Sheets

(51) Int. Cl.

| | | |
|---|---|---|
| *B32B 25/14* | (2006.01) | |
| *C08F 214/18* | (2006.01) | |
| *C08F 214/22* | (2006.01) | |
| *C08F 214/28* | (2006.01) | |
| *H01M 8/0271* | (2016.01) | |
| *H01M 8/0284* | (2016.01) | |
| *H01M 8/0273* | (2016.01) | |
| *C08L 27/12* | (2006.01) | |
| *C08L 27/16* | (2006.01) | |
| *C08L 27/20* | (2006.01) | |
| *H01M 2/08* | (2006.01) | |
| *C08F 14/18* | (2006.01) | |
| *C08F 14/22* | (2006.01) | |
| *C08F 14/28* | (2006.01) | |
| *H01M 8/028* | (2016.01) | |
| *H01M 2/14* | (2006.01) | |
| *H01M 8/0286* | (2016.01) | |
| *H01M 8/1018* | (2016.01) | |

(52) U.S. Cl.
CPC ............... *C08F 14/18* (2013.01); *C08F 14/22* (2013.01); *C08F 14/28* (2013.01); *C08L 27/12* (2013.01); *C08L 27/16* (2013.01); *C08L 27/20* (2013.01); *H01M 2/08* (2013.01); *H01M 2/14* (2013.01); *H01M 8/028* (2013.01); *H01M 8/0271* (2013.01); *H01M 8/0273* (2013.01); *H01M 8/0286* (2013.01); *B32B 2307/51* (2013.01); *B32B 2327/12* (2013.01); *B32B 2581/00* (2013.01); *C08F 214/18* (2013.01); *C08F 214/22* (2013.01); *C08F 214/28* (2013.01); *H01M 2008/1095* (2013.01); *Y02P 70/56* (2015.11)

(56) References Cited

U.S. PATENT DOCUMENTS

| | | | |
|---|---|---|---|
| 4,830,920 A * | 5/1989 | Hayashi et al. ............... 428/421 | |
| 4,833,212 A * | 5/1989 | Yamada ................... C08K 3/22 525/326.2 | |
| 4,943,473 A * | 7/1990 | Sahatjian ............. A41D 27/245 428/334 | |
| 4,985,520 A * | 1/1991 | Hayashi et al. ............... 526/254 | |
| 5,231,143 A * | 7/1993 | Abraham ................... 525/326.2 | |
| 5,266,650 A * | 11/1993 | Guerra et al. .............. 525/326.4 | |
| 5,320,888 A * | 6/1994 | Stevens ........................ 428/36.2 | |
| 5,756,588 A * | 5/1998 | Kolb et al. ................. 525/326.3 | |
| 6,277,937 B1 | 8/2001 | Duvalsaint et al. .......... 526/255 | |
| 6,284,401 B1 * | 9/2001 | Marchetti ..................... 429/442 | |
| 6,326,436 B2 * | 12/2001 | Bowers ............... C08F 214/222 525/248 | |
| 6,329,469 B1 * | 12/2001 | Bowers ............... C08F 214/222 525/248 | |
| 6,346,300 B1 * | 2/2002 | Ruepping ............... C08L 33/08 427/517 | |
| 6,429,271 B1 * | 8/2002 | Schmiegel .......... C08F 214/222 525/248 | |
| 7,344,796 B2 * | 3/2008 | Yuan ........................ C08K 3/04 429/509 | |
| 7,365,122 B2 | 4/2008 | Kojima et al. | |
| 8,048,550 B2 * | 11/2011 | Yuan ........................ C08K 3/04 429/509 | |
| 8,481,140 B2 * | 7/2013 | Doi .......................... C08K 5/13 138/118 | |
| 2001/0000343 A1 * | 4/2001 | Bowers ............... C08F 214/222 526/255 | |
| 2001/0033958 A1 * | 10/2001 | Marchetti ....................... 429/35 | |
| 2001/0036972 A1 * | 11/2001 | Ruepping ............. C08F 255/02 521/50.5 | |
| 2002/0035220 A1 * | 3/2002 | Bowers ............... C08F 214/222 526/247 | |
| 2003/0175575 A1 * | 9/2003 | Zuber et al. ..................... 429/35 | |
| 2004/0162380 A1 * | 8/2004 | Kojima et al. ................. 524/462 | |
| 2004/0239008 A1 * | 12/2004 | Gottlieb .............. B29C 45/0053 264/494 | |
| 2005/0181261 A1 * | 8/2005 | Yuan et al. ...................... 429/35 | |
| 2005/0187331 A1 * | 8/2005 | Yuan et al. ................... 524/462 | |
| 2006/0012125 A1 * | 1/2006 | Salameh ................ F02F 11/002 277/325 | |
| 2006/0060296 A1 * | 3/2006 | Sigler et al. ................ 156/272.2 | |
| 2006/0269808 A1 * | 11/2006 | Merlo et al. ..................... 429/26 | |
| 2008/0021148 A1 * | 1/2008 | Adair ................... C08K 5/0025 524/544 | |
| 2008/0193826 A1 * | 8/2008 | Yuan et al. ...................... 429/35 | |
| 2009/0092886 A1 * | 4/2009 | Brush et al. ..................... 429/35 | |
| 2009/0258273 A1 * | 10/2009 | Arcella et al. .................. 429/33 | |
| 2010/0015485 A1 * | 1/2010 | Conti et al. ..................... 429/26 | |
| 2010/0166965 A1 * | 7/2010 | Salameh ........... B29C 45/14016 427/299 | |
| 2010/0260991 A1 * | 10/2010 | Subramanian .......... B32B 27/32 428/213 | |
| 2011/0033759 A1 * | 2/2011 | Schmidt ........................ 429/425 | |
| 2011/0156357 A1 * | 6/2011 | Noguchi ............... C09K 3/1009 277/336 | |

FOREIGN PATENT DOCUMENTS

| | | |
|---|---|---|
| CN | 101542792 A | 9/2009 |
| CN | 101673833 A | 3/2010 |
| JP | 02-124910 A | 5/1990 |
| JP | 2000-133288 A | 5/2000 |
| JP | 2001-176519 A | 6/2001 |
| JP | 2004-250520 A | 9/2004 |
| JP | 2005140196 A | 6/2005 |
| JP | 2005243327 A | 9/2005 |
| JP | 2005-276637 A | 10/2005 |
| JP | 2005-314653 A | 11/2005 |
| JP | 2008195947 A | 8/2008 |
| JP | 2008-311113 A | 12/2008 |
| JP | 2009117063 A | 5/2009 |
| JP | 2010174202 A | 8/2010 |
| KR | 1019920009902 B1 | 11/1992 |
| WO | 88/08857 A1 | 11/1988 |
| WO | WO 01/05885 * | 1/2001 |

OTHER PUBLICATIONS

"Mooney Viscometer—Future Foundation" (Nov. 2003).*
"Mooney Viscometer—Wikipedia" (https://en.wikipedia.org/wiki/Mooney_viscometer) (webpage retrieved Sep. 19, 2016).*
"Market Trends for Fuel Cells and Related Products", Reference No. K9168H01, Transmittal No. 474525, Transmittal Date: Oct. 25, 2016, 1st edition, published Dec. 24, 2003, 6 pages.
DuPont Viton Selection Guide, K9168H01, 16 pages.

* cited by examiner

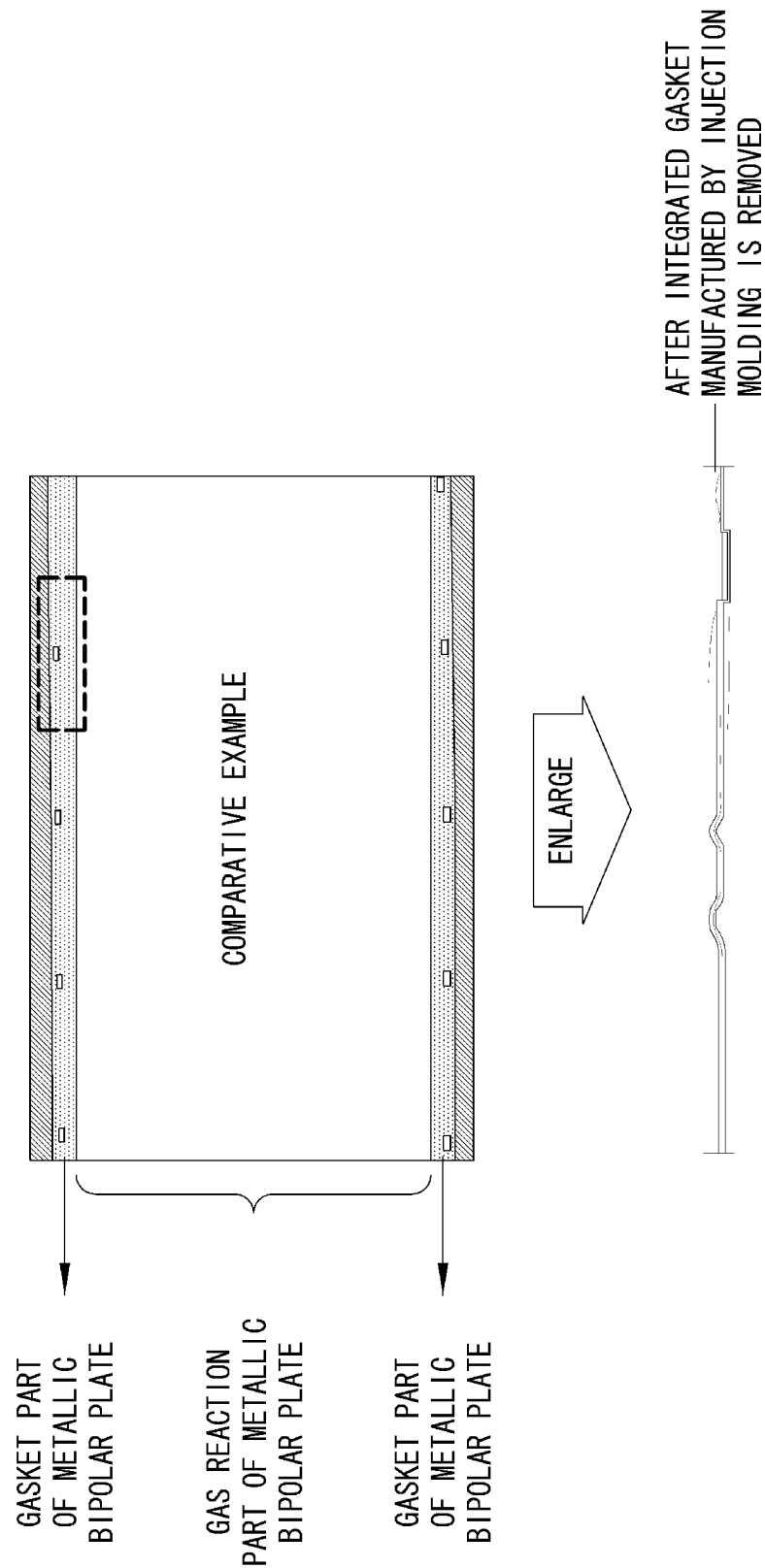

INTEGRATED FLUORINE GASKET MANUFACTURED BY INJECTION MOLDING FOR HYDROGEN FUEL CELLS

CROSS-REFERENCE TO RELATED PATENT APPLICATION

This application claims the benefit of Korean Patent Application No. 10-2012-0102744, filed on Sep. 17, 2012, in the Korean Intellectual Property Office, the disclosure of which is incorporated herein in its entirety by reference.

BACKGROUND OF THE INVENTION

1. Field of the Invention

The present invention relates to an integrated fluorine gasket manufactured by injection molding for hydrogen fuel cells. More particularly, the present invention relates to an integrated high-fluidity/high-elasticity fluorine gasket manufactured by injection molding for hydrogen fuel cells that has excellent fluidity and excellent elasticity so that, when a fluorine gasket is integrated with a thin bipolar plate by injection molding on the thin bipolar plate, the thin bipolar plate may be minimally deformed and sealing durability of a stack is increased as a result.

2. Description of the Related Art

In general, polymer electrolyte membrane fuel cells (PEMFCs) are widely used as fuel cells for vehicles. Thus, once several hundreds of unit cells of PEMFCs are stacked together to be manufactured as a single contiguous stack, in order to mount the stack on a vehicle and to provide high output performance of about 100 kW in various operation conditions normally, PEMFCs should operate stably in a wide range of current densities.

During a reaction for generating electricity in the fuel cells, after hydrogen supplied to an anode that is an oxidation electrode in a membrane-electrode assembly (MEA) of the fuel cells is divided into protons (or hydrogen ions) and electrons, protons are moved to a cathode that is a reduction electrode through an electrolyte membrane, and electrons are moved to the cathode through an external circuit. Oxygen molecules, hydrogen ions, and electrons react in the cathode together to generate electricity and heat and simultaneously to generate water as a reactant product. (Hereinafter, a membrane-electrode assembly and an MEA are used and referenced together as a single unit.)

In order to maintain a seal with respect to hydrogen/air that are reactant gases and water in the stack of the fuel cells used for vehicles, a gasket should be used in each cell. Thus, the gasket can be independently and separately manufactured so that it can be mounted in the fuel cell. Alternatively, the MEA and the gasket can be integrated with each other, or the gasket can be integrated with a bipolar plate by injection molding the gasket on the bipolar plate.

In order to produce a stack of fuel cells on a large scale efficiently, components should be rapidly assembled and stacked. In a large stack system, such as a hydrogen fuel cell vehicle, it is preferable to use a bipolar plate-integrated gasket having excellent handling properties and excellent heat-resistant properties during cross-linking of the gasket. FIG. 1 is a perspective view of a conventional process of assembling a stack in which existing bipolar plate and gasket are not integrated with each other. As illustrated in FIG. 1, a conventional catalyst-coated membrane (CCM) type MEA that is configured by coating both sides of a membrane with catalysts of two electrodes, such as an anode and a cathode, and by bonding the catalysts of two electrodes is provided.

However, in a conventional stack assembling process, a CCM MEA 1, a gas diffusion layer 2, a gasket 3, and a bipolar plate 4 should be bonded to one another so that the number of working processes and a working time can be increased. In addition, since these stack components are not in the form of an integrated module, most of the assembling process is performed manually. Thus, when the arrangement of the components is not precise or non-uniform, the entire cell performance and durability may be lowered after a fuel cell stack is assembled.

In order to solve the problems of the conventional stack assembling process, a process of assembling a fuel cell stack by using a structure (3+4) that is formed by integrating a gasket 3 and a bipolar plate 4 prior to assembling, as illustrated in FIG. 2 has begun to be widely used. When the gasket 3 is used after being integrated with the bipolar plate 4 by injection molding on the bipolar plate 4, an individual gasket does not need to be additionally attached to the bipolar plate 4 during stack assembling so that the stack assembling process is more convenient and mass productivity can be increased.

A gasket used for a fuel cell stack for hydrogen fuel cells should satisfy various requirement properties, such as proper hardness, superior elasticity or a very low compression set, excellent mechanical properties, excellent resistance to acid/resistance to hydrolysis, low diffusion with respect to hydrogen/air (or oxygen)/coolant, a low content of impurities that may cause catalyst poisoning, excellent thermal resistance, high electrical insulation, high productivity, and low cost. Polymeric elastomers that are mainly used in a gasket for a stack for hydrogen fuel cell vehicles that satisfy these requirement properties, may be largely classified into fluorine-based elastomers (or fluoroelastomers), silicone elastomers, and hydrocarbon elastomers.

The fluorine-based elastomers are largely classified into FKM and FFKM by American Society for Testing and Materials (ASTM) and are widely used in various fields, such as car/construction/petrochemicals industries. The silicone elastomers are largely classified into general-purpose silicone elastomers, such as polydimethylsiloxane, and modified silicone elastomers, such as fluorosilicone. Solid silicone elastomers can be used. However, liquid silicone rubber has been more widely used for precise injection molding for fuel cells. In addition, the hydrocarbon elastomers, such as ethylene-propylene diene monomer (EPDM) and ethylene-propylene rubber (EPR), have been used.

The fluorine-based elastomers in particular, which have excellent elasticity, excellent resistance to acid and heat, are often used for applications that are subjected to long term severe operation conditions, such as hydrogen fuel cell vehicles and have received much attention as a gasket for stack applications.

In particular, the fluorine-based elastomers show low polarizability and unique properties caused by strong electronegativity of fluorine atoms. When the fluorine content of the fluoroeleastomers is large, the fluorine-based elastomers show characteristics, such as high thermal/chemical/ageing resistance, weather resistance, excellent chemical resistance with respect to solvent/hydrocarbon/acid/alkali, low dielectric constants, low flammability, low surface energy and low moisture absorption. In addition, C—F bonds contribute to high resistances to both oxidation and hydrolysis.

However, conventional commercialized fluorine-based elastomers have high molecular weights and high melt viscosity and thus are not appropriate to form into complicated shapes quickly and easily. Thus, for the most part, fluorine-based elastomers are used in compression molding, transfer molding, extrusion, and calendering rather than precise injection molding.

In particular, in order to manufacture a gasket for hydrogen fuel cell vehicles by injection molding the gasket on a thin bipolar plate by using over-molding, as described above, an injection molding processability of a fluorine compound based on fluoroelastomers must be very excellent. As it currently stands, this is not the case.

To this end, fluidity of the fluorine compound should be high, and pre-curing or scorch should not occur during cross-linking, and in order to guarantee 10-year durability for hydrogen fuel cell vehicles, a gasket for a stack is required to exhibit high elasticity to secure sealing durability.

SUMMARY OF THE INVENTION

The present invention provides an integrated high-fluidity/high-elasticity fluorine gasket manufactured by injection molding for hydrogen fuel cells that has low Mooney viscosity compared to a fluorine compound based on conventional commercialized fluorine-based elastomers so that fluidity and a scorch time are increased and an injection molding processability may be improved and simultaneously a low compression set may cause a further increase in elasticity and thus sealing durability of a stack may be increased.

According to an aspect of the present invention, there is provided an integrated fluorine gasket manufactured by injection molding for hydrogen fuel cells, in which a fluorine compound having a fluorine content of about 60 to 75 parts by weight based on 100 parts by weight of a fluoroelastomer is used in a gasket and a fluorine gasket is integrated with a thin bipolar plate having a thickness of about 200 μm or less to have a thickness of about 750 μm or less by injection molding on the thin bipolar plate and by cross-linking.

In order to use the integrated fluorine compound manufactured by injection molding on the bipolar plate in a gasket for a fuel cell stack, the fluorine compound may be secondly post-cross-linked or post-cured at a high temperature of at least about 200° C.

Additionally, the fluorine compound may have shore A hardness of about 35 to 65 in a condition of ASTM D2240.

The fluorine compound may have Mooney viscosity of about 10 to 26 in a condition of ISO 289-1(2005): ML(1+4)/125° C.

The fluorine compound may have a scorch time of about 1.7 to 3.0 minutes that is measured by using a moving die rheometer (MDR) based on ISO 6502:1999(E) in a condition of temperature about 185° C./oscillation amplitude 0.5°/time 10 minutes.

The fluorine compound may have about a 90% cure time ($t'_c(90)$)
of 3.5 to 5.0 minutes that is measured by using an MDR based on ISO 6502:1999(E) in a condition of temperature 185° C./oscillation amplitude 0.5°/time 10 minutes. The fluorine compound may have ΔM of at least about 10.5 dN·m that is a difference between highest torque ($M_H$). and minimum torque ($M_L$).

by using an MDR based on ISO 6502:1999(E) in a condition of temperature of about 185° C./oscillation amplitude 0.5°/time 10 minutes.

The fluorine compound may have a filling percentage of spider mold flow of about 75% or more by using a 1.6 mm-sprue in a condition of temperature 180° C./pressure 6 MPa/time 7 minutes.

The integrated fluorine compound manufactured by injection molding on the bipolar plate may have a compression set of about 4% or less as a fluorine gasket in a condition of ASTM D395 (Method B, 25% Deflection, 150° C./72 hours).

The integrated fluorine compound manufactured by injection molding on the bipolar plate may have a compression set of about 9% or less as a fluorine gasket in a condition of ASTM D395 (Method B, 25% Deflection, 150° C./336 hours).

The integrated fluorine compound manufactured by injection molding on the bipolar plate may include a fluorine gasket in which, when a degree of deformation of the thin bipolar plate is measured in 15 positions of the thin bipolar plate by using a contour measuring device, an average value of degrees of deformation is less than about 60 μm.

The integrated fluorine compound manufactured by injection molding on the bipolar plate may have compressibility of about 65 to 85% with respect to a fluorine gasket.

The fluoroelastomer may include binary copolymer containing vinylidene fluoride (VDF) and hexafluoropropene (HFP).

BRIEF DESCRIPTION OF THE DRAWINGS

The above and other features and advantages of the present invention will become more apparent by describing in detail exemplary embodiments thereof with reference to the attached drawings in which:

FIGS. 4A and 4B are views for comparing the degree of deformation of a metallic bipolar plate after an integrated gasket manufactured by injection molding is removed from the metallic bipolar plate (edges of the metallic bipolar plate), according to an existing comparative example and an exemplary embodiment of the present invention, respectively;

DETAILED DESCRIPTION OF THE INVENTION

Figure 1:
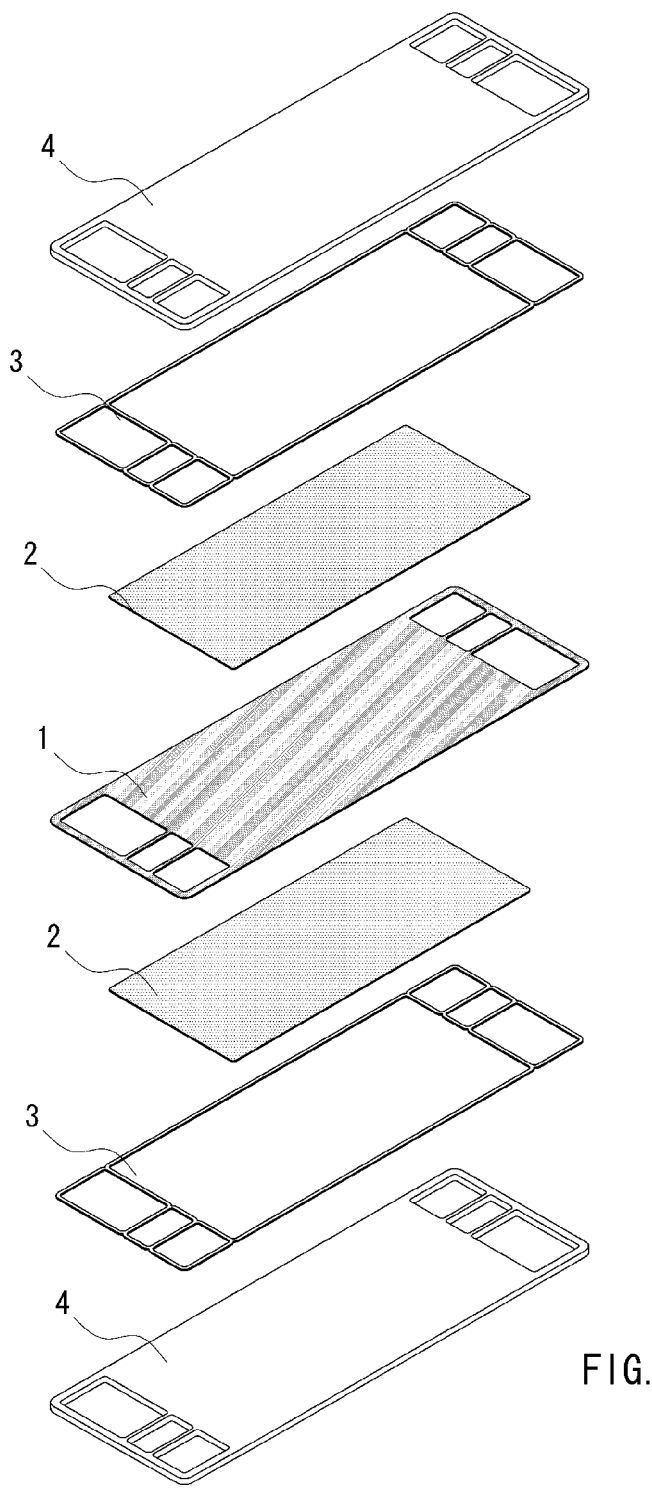
FIG. 1 is a view of a cell assembling process of a conventional fuel cell stack in which a gasket and a bipolar plate are not integrated with each other.
Figure 2:
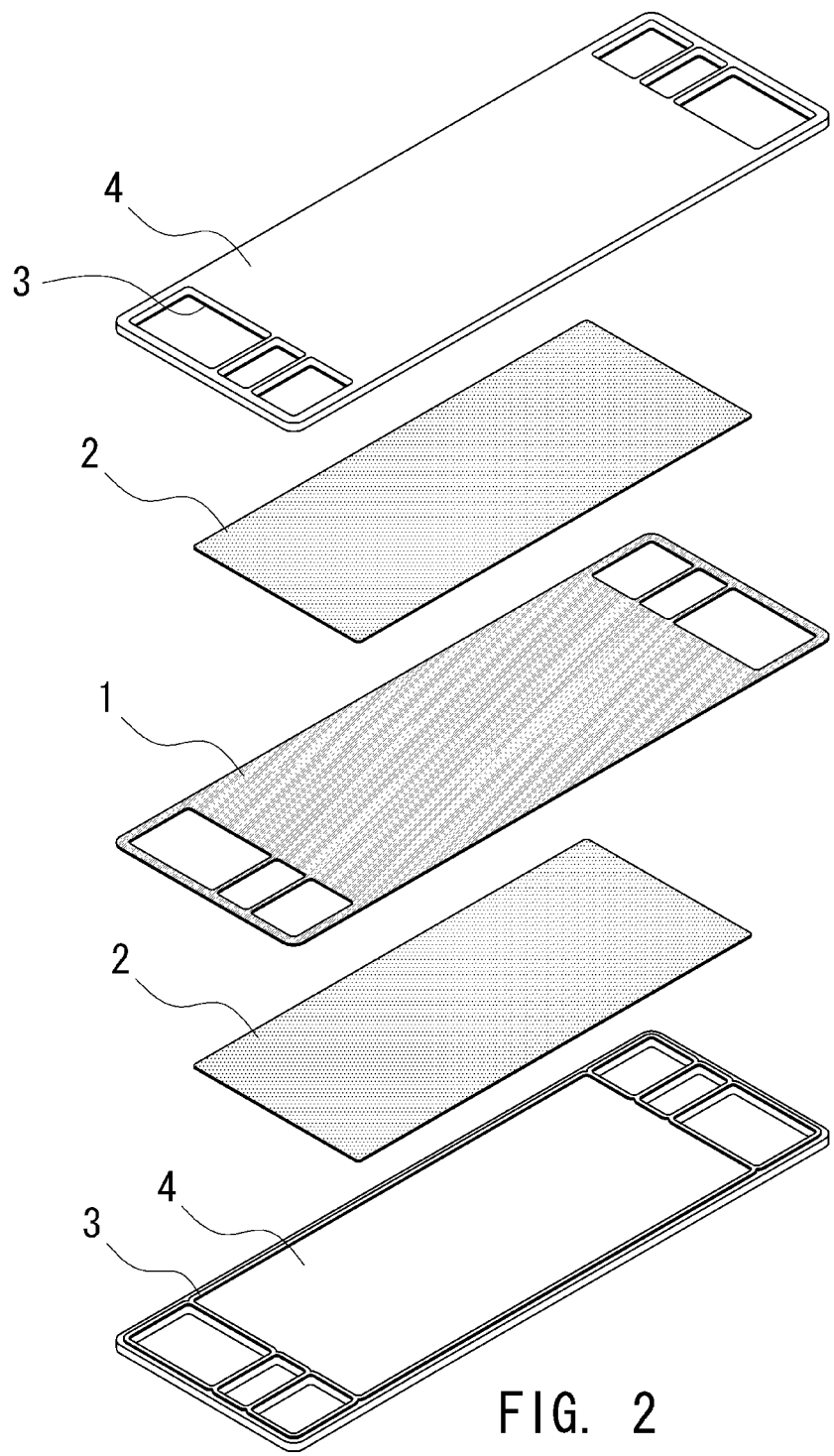
FIG. 2 is a view of a cell assembling process of a fuel cell stack in which a gasket and a bipolar plate are integrated with each other, according to an exemplary embodiment of the present invention.

The present invention will now be described more fully with reference to the accompanying drawings, in which exemplary embodiments of the invention are shown.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Fluoroelastomer may be manufactured as a copolymer by copolymerizing various monomers. Representative monomers include vinylidene fluoride (VDF), tetrafluoroethylene (TFE), hexafluoropropene (HFP), and perfluoroalkyl vinyl ether (PAVE).

Preferably, only binary or ternary copolymer including these monomers, or copolymer that is blended with another at least one thermoplastic/thermoset)/rubber polymer or is mixed with organic/inorganic materials, may be used as a material for a fluorine gasket for a stack for hydrogen fuel cell vehicles.

An integrated fluorine gasket manufactured by injection molding for hydrogen fuel cells according to the exemplary embodiment of the present invention is characterized by including VDF and HFP, by using a fluorine compound having a fluorine content of about 60 to 75 parts by weight based on 100 parts by weight of a fluoroelastomer as a binary copolymer compound in a gasket, and by integrating a fluorine gasket by injection molding the fluorine gasket on a thin bipolar plate having a thickness of about 200 μm or less to have a thickness of about 750 μm or less and by crosslinking the fluorine gasket.

In this case, the fluorine content of the fluoroelastomer may be about 60 to 75 parts by weight based on 100 parts by weight of the fluoroelastomer. This is because, if the fluorine content is less than about 60 parts by weight, unique and excellent characteristics of the fluoroelastomer, such as thermal resistance, resistance to chemistry, and resistance to hydrolysis described above, are lowered and if the fluorine content exceeds about 75 parts by weight, low temperature flexibility of the fluoroelastomer is greatly lowered and thus the fluoroelastomer cannot be easily used at a low temperature (e.g., less than 0° C.).

Here, for better understanding, after describing an existing comparative example, an embodiment of the present invention will be described below.

Comparative Example

A ternary copolymer compound including VDF, HFP, and TFE among conventional commercialized fluorine-based elastomers and having a fluorine content of 66 parts by weight based on 100 parts by weight of a fluoroelastomer was used as a fluorine compound in a comparative example. Like in the following embodiment, even in the comparative example, a fluorine compound is based on the fluoroelastomer. The fluorine compound was manufactured by adding a crosslinking agent, a co-agent or an accelerator, an acid scavenger, an activator, a filler, and other additives to the fluoroelastomer-based fluorine compound, and bisphenol was used as the crosslinking agent.

In order to compare an injection molding processability of gaskets in an injection molding machine actually used in a gasket for hydrogen fuel cells, as an example for manufacturing a fluorine gasket according to the comparative example, a fluorine gasket was manufactured in the same manner as the above-described manufacturing example of the embodiment and was used.

Exemplary Embodiment

A binary copolymer compound including VDF and HFP among conventional commercialized fluorine-based elastomers and having a fluorine content of 66 parts by weight based on 100 parts by weight of a fluoroelastomer was used as a fluorine compound in the exemplary embodiment of the present invention. The fluorine compound according the present embodiment has low Mooney viscosity compared to the comparative example, has high fluidity and simultaneously high crosslinking density and thus is designed to further increase elasticity.

The fluorine compound according to the present exemplary embodiment is based on the fluoroelastomer. The fluorine compound was manufactured by adding a crosslinking agent, a co-agent or an accelerator, an acid scavenger, an activator, a filler, and other additives to the fluoroelastomer-based fluorine compound.

The fluorine compound according to the present exemplary embodiment may use a crosslinking agent as preferably only one among bisphenol/organic peroxide/diamine or by mixing two or more bisphenol/organic peroxide/diamine, and in the present embodiment, bisphenol was used as the crosslinking agent.

In an exemplary embodiment of the present invention, since a bipolar plate that is actually used in hydrogen fuel cell vehicles needs to be sufficiently thin so as to attain a high output in a limited amount of space, a bipolar plate having a thickness of 200 μm or less is adopted. In addition, the thickness of a gasket that is to be integrated with the bipolar plate by injection molding on the bipolar plate, may be as small as possible in a range in which sealing can still be maintained. In order to mount the gasket on a hydrogen fuel cell vehicle, the gasket may, for example, have a thickness of 750 µm or less.

Thus, in order to compare an injection molding processability of gaskets in an injection molding machine to be actually used in a gasket for a hydrogen fuel cell as an example for manufacturing a fluorine gasket according to the exemplary embodiment of the present invention, a fluorine compound was injection-molded on an outside surface of a metallic thin bipolar plate having a thickness of 100 µm and was first cross-linked so that a fluorine gasket was manufactured to be integrated with the metallic thin bipolar plate.

In this case, a thin gasket was manufactured by controlling the thickness of a gasket that was injection-molded on the metallic thin bipolar plate so that the maximum thickness of the gasket does not exceed 680 µm. The fluorine gasket that was integrated with the metallic thin bipolar plate, was secondly post-cross-linked or post-cured sufficiently at a high temperature of at least 200° C. and then was used as a gasket for a stack.

Experimental Example

Material properties of the fluorine gasket according to the existing comparative example and the embodiment of the present invention, respectively, were measured as below:
 Hardness: Shore A hardness was measured based on ASTM D2240.
 Mooney viscosity: Mooney viscosity of the fluorine compound was measured in a condition of ML(1+4)/125° C. based on ISO 289-1(2005).
 Compression set: standard test samples were manufactured based on ASTM D395 (method B, 25% deflection) and were thermally treated at 150° C. for 72, 168, and 336 hours, respectively.
 Filling percentage of spider mold flow: was measured using a 1.6 mm-sprue in a condition of temperature 180° C./pressure 6 MPa/time 7 minutes.
 Crosslinking or curing kinetics: a crosslinking speed was calculated by measuring a cure curve by using a moving die rheometer (MDR) based on ISO 6502:1999 (E) in a condition of temperature 185° C./oscillation amplitude 0.5°/time 10 minutes.
 Degree of deformation of metallic bipolar plate: after fluorine compounds were injection-molded on a metallic bipolar plate so as to manufacture integrated gaskets, the gaskets were removed from the metallic bipolar plates and the degree of deformation of the metallic bipolar plate was measured in a quantitative manner by applying a measuring force of 30 mN by using a contour measuring instrument: Contracer CV-3000 Model, Mitutoyo Co., Japan.

In this case, five metallic bipolar plates with which fluorine gaskets according to a comparative example and an exemplary embodiment of the present invention were integrated, were used and their degrees of deformation were measured, and an average value of the degrees of deformations was used, and measurement was performed in total 16 positions of each metallic bipolar plate.
 Repetitive compression behavior of gasket: after the fluorine compounds were sufficiently cross-linked, test samples having a similar shape to an O-ring (width 3.0 mm, area 7.257 cm$^2$) were manufactured, and variations in thicknesses of the test samples were measured as a function of compression pressure from 0.01 to 67.6 MPa by using a commercialized compression test machine, Dae Kyung Tech., Korea.
 Electrochemical cell performance: first, after the fluorine gaskets according to a comparative example and an embodiment of the present invention were integrated with the metallic bipolar plate by injection molding and crosslinking, 5-cell stacks were manufactured for each example. The same MEA and the gas diffusion layer were used when stacks were manufactured according to the comparative example and the exemplary embodiment of the present invention, respectively.

In addition, potential-current density polarization of fuel cell stacks including bipolar plates with which the fluorine gaskets were integrated according to the comparative example and the embodiment of the present invention was measured using existing commercialized equipment, 5 kW Test Station Model, Won-A Tech Co., Korea.

In addition, in order to compare contact resistances in the stacks including the integrated fluorine gaskets according to the comparative example and the embodiment of the present invention, high frequency resistance (HFR) was measured using existing commercialized equipment, Galvanostat, Z# Navigator Model, Won-A Tech Co., Korea in a condition of amplitude of 14 mA/cm$^2$ and a frequency of 1 kHz.

In this case, electrochemical cell performance and contact resistance of the 5-cell stacks were measured in the following operation conditions.
 inlet temperature of a cell for a hydrogen fuel cell=65° C.;
 reactant gases: anode/cathode=hydrogen/air;
 gas pressure=near ambient pressure;
 hydrogen anode/air cathode relative humidity (R.H.)=100%/100%;
 hydrogen anode/air cathode stoichiometric ratio (S.R.)=1.5/2.0.

As a result of the experimental example, the result of evaluating the material properties of the fluorine gaskets according to the existing comparative example and the embodiment of the present invention is as follows.

Hardness

Although a fluorine gasket having high Shore A hardness that exceeds 65 and is less than 90 has been widely in existing industries, when a gasket having such high hardness is used as a gasket for a fuel cell stack for hydrogen fuel cell vehicles, it is difficult to maintain intimate contact and a seal between several tens of repetitive components inside the stack. Thus, a gasket having hardness of 65 or less should be used.

On the other hand, when the hardness is too low and is less than 35, cross-linking density is very low, and elasticity of the gasket is greatly decreased, and a compression set that is inversely proportional to elasticity exceeds a proper level. Additionally, the excessive compression of a cell may occur due to low hardness. Thus, a gasket having hardness of 35 or more should preferably be used. Thus, a fluorine gasket having Shore A hardness of about 35 to 65 may be used for a stack for hydrogen fuel cell vehicles.

Thus, in the existing comparative example and the embodiment of the present invention, after fluorine gaskets having Shore A hardness of 51 were manufactured so as to make the same hardness, other general material properties and performance were measured and compared.

Fluidity

Mooney viscosity is a significant index indicating fluidity and may be used in approximately analogizing a molding processability of a fluorine compound before being injection molded. If Mooney viscosity is less than about 10, general material properties of the fluorine gasket, such as a mechanical property and a handling property, may be greatly lowered, and if Mooney viscosity exceeds about 26, a precise injection molding processability may be lowered so that gasket productivity may be lowered. Thus, in a gasket for a stack for hydrogen fuel cells, the fluorine compound may have Mooney viscosity of about 10 to 26.

As shown in the following Table 1, although Mooney viscosity of an existing fluorine compound according to a comparative example is 27, Mooney viscosity of a fluorine compound according to an embodiment of the present invention is 21, which indicates that fluidity of the fluorine compound according to the embodiment of the present invention is higher than that of the fluorine compound according to the comparative example.

TABLE 1

| Item | Unit | Comparative example | Embodiment |
|---|---|---|---|
| Mooney viscosity | — | 27 | 21 |
| Filling percentage of spider mold flow | % | 71 | 78 |

A filling percentage of spider mold flow may be used as another index indicating fluidity of the fluorine compound. The filling percentage of spider mold flow may be at least 75% or more in order to precisely mold a gasket on a thin bipolar plate.

As a result of measuring and comparing filling percentages of spider mold flow according to the existing comparative example and the embodiment of the present invention, as shown in the above Table 1, filling percentages of spider mold flow were measured as 71% and 78%, respectively, and the fluorine compound according to the present exemplary embodiment shows better fluidity, and thus this means that injection molding to form an actual gasket can be more precisely and easily performed.

Cross-Linking Kinetics

As described above, a gasket for a stack for hydrogen fuel cells is injection molded and first cross-linked on the peripheral area of a metallic bipolar plate and is manufactured as a thin gasket and then undergoes an additional secondary post-crosslinking process. Thus, it is very important to maintain an appropriate crosslinking rate when a thin gasket is injection molded in a mold. This is because, when a crosslinking rate is too high when a fluorine compound is injection molded, excessive pre-curing or scorch occurs before the fluorine compound is sufficiently molded in the form of a gasket so that gasket non-molding problem may occur and if the crosslinking rate is too low, the time required to remain inside the mold after the injection is increased so that a cycle time for gasket production may be increased and gasket productivity may be lowered. The crosslinking rate when the fluorine compound is actually injection molded may be indicated using an MDR technique.

A scorch time $t_{s1}$ of a fluorine compound for a gasket in MDR may be about 1.7 to 3.0 minutes. This is because, when the scorch time $t_{s1}$ is less than about 1.7 minutes, an injection molding processability may be lowered due to excessive pre-curing and when the scorch time $t_{s1}$ exceeds about 3.0 minutes, a cycle time for gasket production may be increased.

In addition, about a 90% cure time $t'_c(90)$ may be about 3.5 to 5.0 minutes. This is because, when the 90% cure time $t'_c(90)$ is less than about 3.5 minutes, an injection molding processability may be lowered due to pre-curing and when the 90% cure time $t'_c(90)$ exceeds about 5.0 minutes, a cycle time for gasket production may be increased.

Results of MDR measurement according to the above-described comparative example and the embodiment of the present invention are as shown in the following Table 2. In the exemplary embodiment of the present invention, the crosslinking rate is controlled to be properly delayed to be suitable for injection molding compared to the comparative example so that $t_{s1}$ and $t'_c(90)$ may be 1.9 minutes and 4.1 minutes, respectively and the fluorine compound may be sufficiently well molded in the form of a gasket.

TABLE 2

| Item | Unit | Comparative example | Embodiment |
|---|---|---|---|
| $t_{s1}$ | min | 1.5 | 1.9 |
| $t'_c(90)$ | min | 3.2 | 4.1 |

Figure 3A:
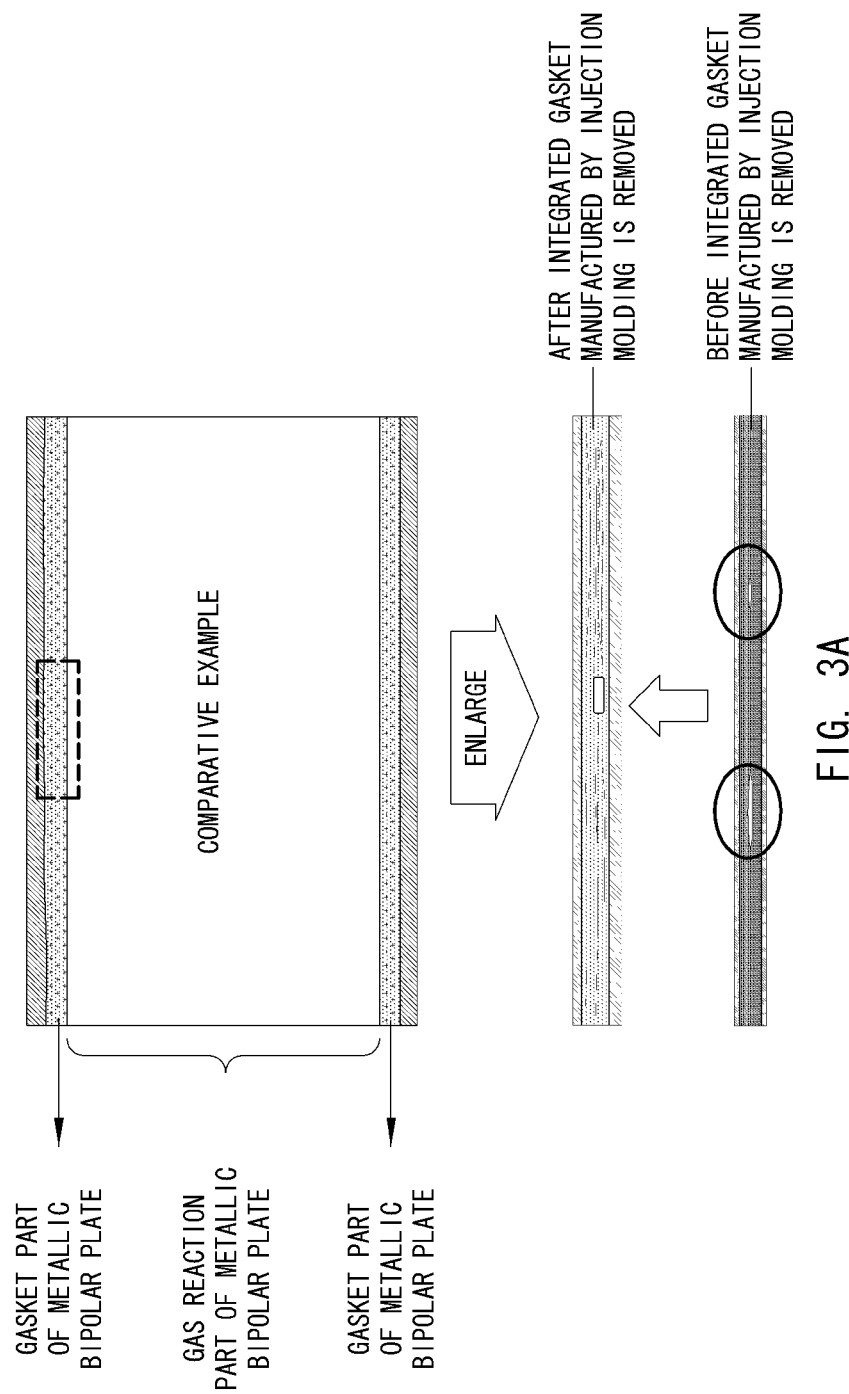
FIGS. 3A and 3B are views for comparing the degree of deformation of a metallic bipolar plate after an integrated gasket manufactured by injection molding is removed from the metallic bipolar plate (the center of the metallic bipolar plate), according to an existing comparative example and an exemplary embodiment of the present invention, respectively.
Figure 3B:
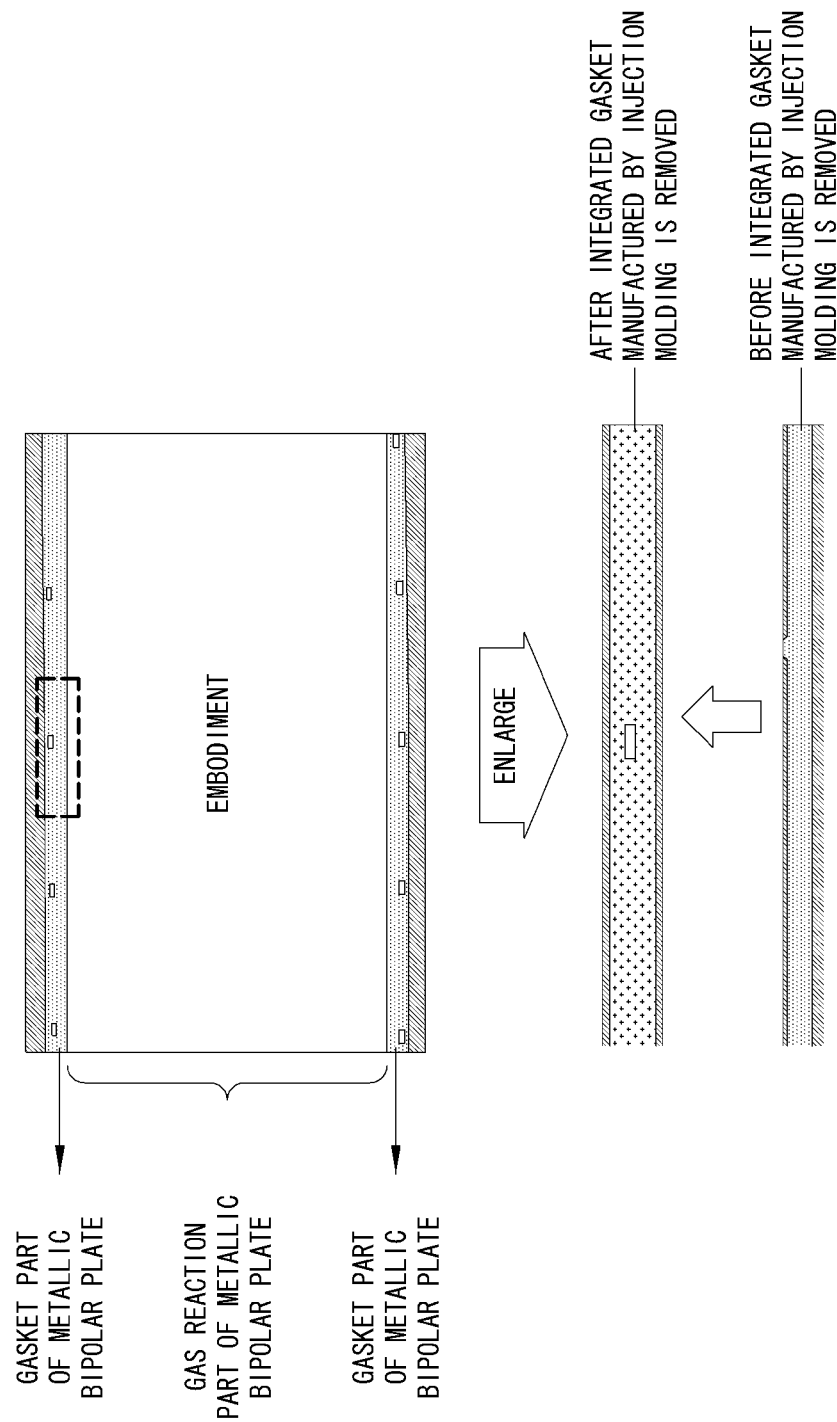

Injection Molding Processability and Degree of Deformation of Metallic Bipolar Plate In order to perform a sensory test of the degree of deformation of thin metallic bipolar plates when gaskets are injection molded on the thin metallic bipolar plates in a qualitative manner, integrated gasket manufactured by injection molding in the above experimental conditions are removed from the thin metallic bipolar plates, and shapes of the gaskets are compared with each other. FIGS. 3A and 3B are views comparing the degree of deformation of a metallic bipolar plate after an integrated gasket manufactured by injection molding is removed from the metallic bipolar plate (the center of the metallic bipolar plate), according to an existing comparative example and the exemplary embodiments of the present invention, respectively.

In the comparative example, as illustrated in FIG. 3A, the gasket is partially unmolded before it is removed from the thin metallic bipolar plate, and part of the thin metallic bipolar plate is exposed such that a mold defective part is formed (circularly marked portion of lower enlarged photo). In addition, when the gasket is completely removed from the thin metallic bipolar plate and the state of the thin metallic bipolar plate is observed, the thin metallic bipolar plate may become significantly deformed. This is due to the low fluidity and high melt viscosity of the fluorine compound used in manufacturing the gasket of the comparative example, which causes severe deformation of the metallic bipolar plate at the time of direct integration by injection molding onto the thin metallic bipolar plate.

In the exemplary embodiment of the present invention, as illustrated in FIG. 3B, the gasket is uniformly injection molded without any unmolded part before it is removed from the thin metallic bipolar plate, and when the gasket is completely removed from the thin metallic bipolar plate and the state of the gasket is observed, the thin metallic bipolar plate is minimally deformed and is for the most part maintained in its original flat state. This can be attributed to the higher fluidity and longer scorch time of the fluorine compound used in the embodiment of the present invention compared to the comparative example, which prevents significant deformation of the thin metallic bipolar plate at the time of direct integration by injection molding onto the thin metallic bipolar plate and this provides enough time to mold the fluorine compound in the form of a gasket.

Figure 4B:
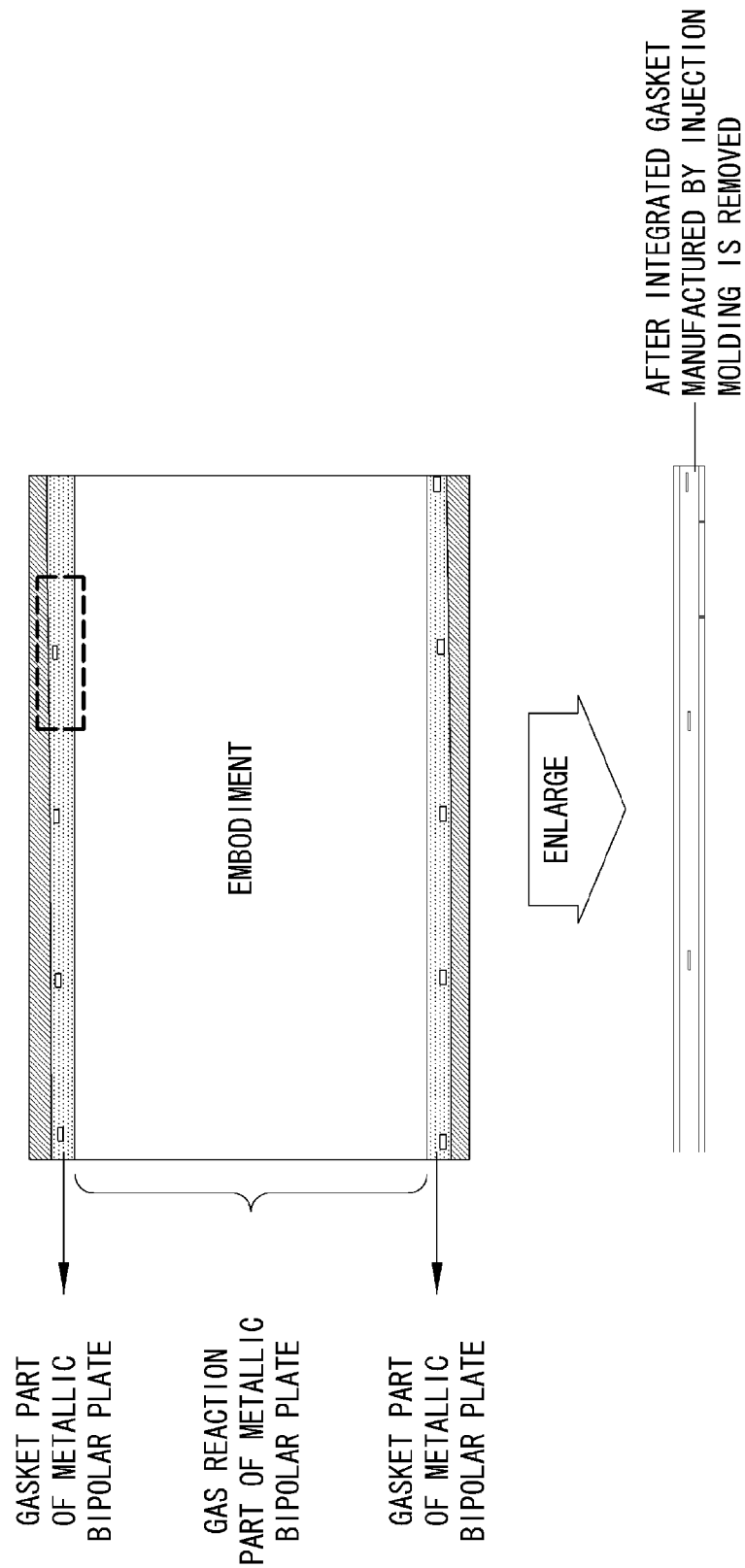

As a result of observing the degree of deformation of the thin metallic bipolar plates in another part, FIGS. 4A and 4B are views comparing the degree of deformation of a metallic bipolar plate after an integrated gasket manufactured by injection molding is removed from the metallic bipolar plate (e.g., edges of the metallic bipolar plate), according to an existing comparative example and an exemplary embodiment of the present invention, respectively.

The parts of the gaskets observed illustrated in FIGS. 4A and 4B according to the comparative example and the exemplary embodiment of the present invention, respectively, are likely to be uniformly integrated with the metallic bipolar plates by injection molding. It was compared and evaluated whether surfaces of the metallic bipolar plates covered by the gaskets were actually deformed when the gaskets were removed from the metallic bipolar plates and were observed.

As shown in the comparative example of FIG. 4A, when the gaskets were removed from the metallic bipolar plates and states of the metallic bipolar plates were observed, the metallic bipolar plates were greatly deformed when the gaskets were injection molded. On the other hand, in the exemplary embodiment of FIG. 4B, the metallic bipolar plates were minimally deformed when the gaskets were injection molded, compared to the metallic bipolar plates according to the comparative example of FIG. 4A. Thus, according to the results of FIGS. 3A and 3B and FIGS. 4A and 4B, in the comparative example, by using an existing fluorine compound, most parts of the metallic bipolar plate are deformed when the gasket is injection molded, whereas, in the exemplary embodiment of the present invention, when the gasket is manufactured using a novel fluorine compound, the metallic bipolar plate is minimally deformed.

In order to compare the degree of deformation of the metallic bipolar plates with which the gaskets are integrated according to the existing comparative example and the exemplary embodiment of the present invention in a quantitative manner, five metallic bipolar plates were measured according to their positions, as described above.

Figure 5:
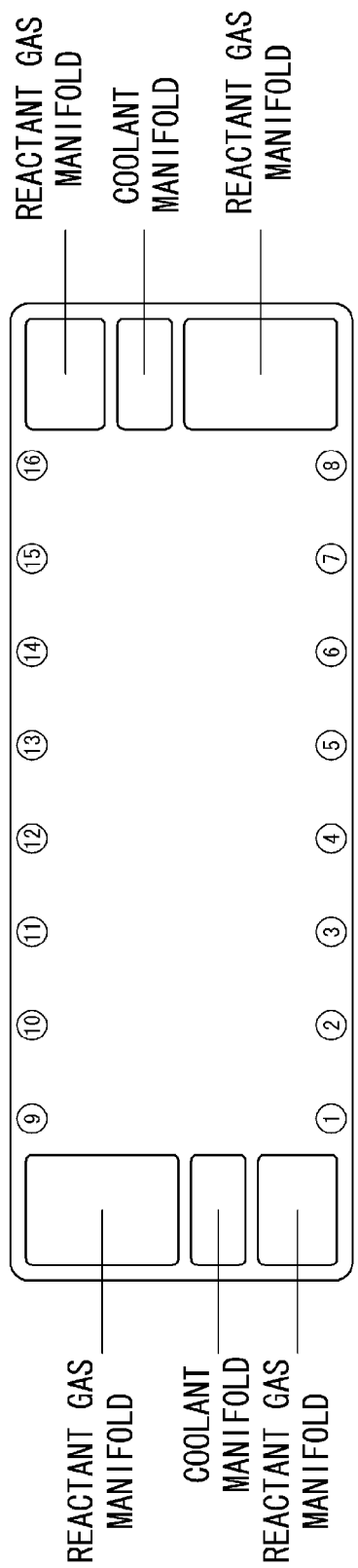
FIG. 5 illustrates 16 positions of a bipolar plate in which the degree of deformation of a metallic bipolar plate is measured, after an integrated gasket manufactured by injection molding is removed from the metallic bipolar plate.
Figure 6:
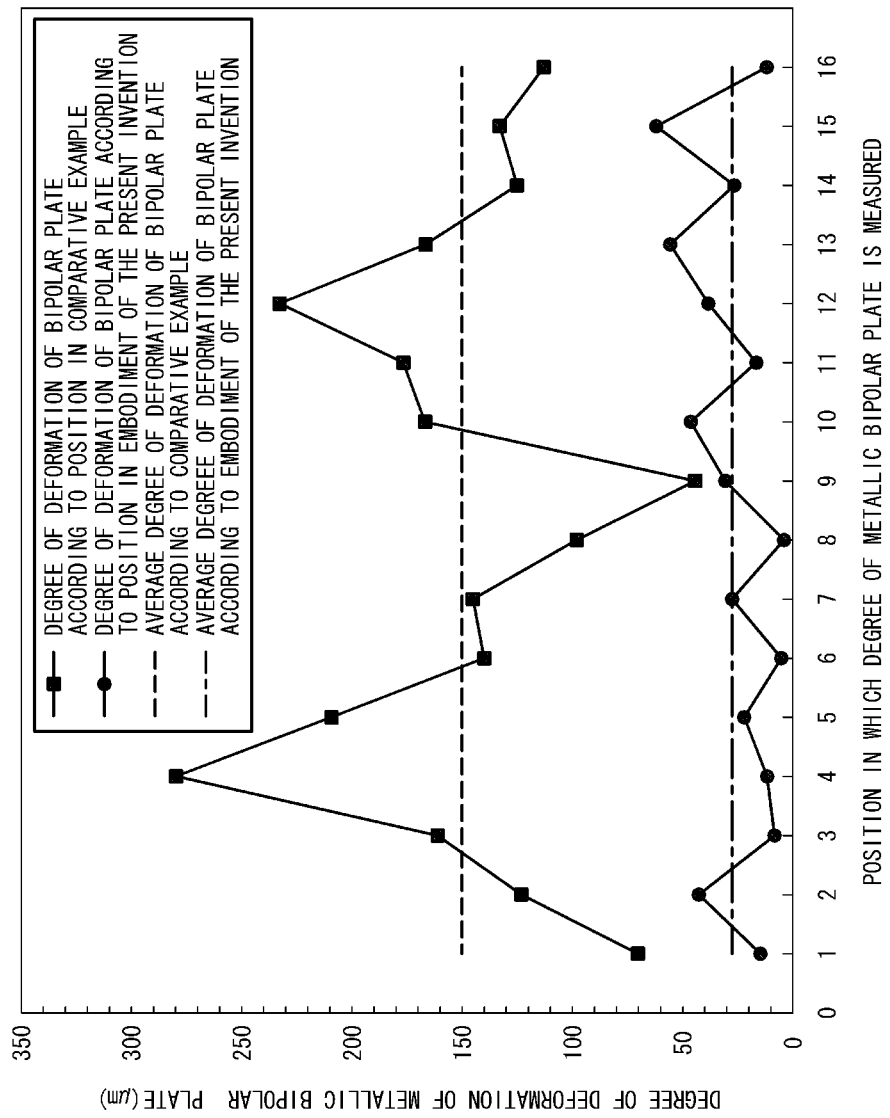
FIG. 6 is a graph showing the degree of deformation according to positions of a metallic bipolar plate after an integrated gasket manufactured by injection molding is removed from the metallic bipolar plate, according to an existing comparative example and an exemplary embodiment of the present invention, respectively.

FIG. 5 illustrates 16 positions of a bipolar plate in which the degree of deformation of a metallic bipolar plate is measured, after an integrated gasket manufactured by injection molding is removed from the metallic bipolar plate, and FIG. 6 is a graph showing the degree of deformation according to positions of a metallic bipolar plate after an integrated gasket manufactured by injection molding is removed from the metallic bipolar plate, according to an existing comparative example and an embodiment of the present invention, respectively.

As illustrated in FIG. 5, the degree of deformation of metallic bipolar plates were measured in 16 positions of each metallic bipolar plate by using a contour measuring device, and an average value of the degree of deformation of five metallic bipolar plates according to their positions is shown in FIG. 6. As illustrated in FIG. 6, the degree of deformation of the metallic bipolar plates according to their positions due to a fluorine gasket manufactured by injection molding in the embodiment is remarkably reduced compared to the comparative example.

That is, an average value and standard deviation value of 16 parts of the metallic bipolar plate in the existing comparative example is 149±59 μm, whereas an average value and a standard deviation value of 16 parts of the metallic bipolar plate in the exemplary embodiment of the present invention is reduced to 27±18 μm so that the effect of reducing the degree of deformation of the metallic bipolar plate of about 82% based on the average value can be obtained.

In this way, when the gasket is injection molded so as to be integrated with the metallic bipolar plate by using a fluorine compound according to the exemplary embodiment of the present invention, the degree of deformation of a thin metallic bipolar plate is greatly reduced so that productivity of the gasket can be greatly increased and simultaneously, when several hundreds of cells are assembled as a stack, the stability of connecting the stack can be remarkably improved.

Elasticity and Repetitive Compression Behavior

In a gasket for a PEMFC, a difference $\Delta M$ between the highest torque $M_H$ and minimum torque $M_L$ of MDR is directly related to crosslinking density and thus it is advantageous for a gasket of PEMFC to have $\Delta M$ of at least 10.5 dN·m. As shown in the following Table 3, $\Delta M$ of a fluorine gasket according to an existing comparative example and an exemplary embodiment of the present invention is 9.9 and 11.1 dN·m, respectively, and $\Delta M$ in the exemplary embodiment of the present invention is greater than $\Delta M$ in the existing comparative example. This means that the fluorine gasket of the exemplary embodiment of the present invention has higher crosslinking density and thus lower compression set and enhanced elasticity compared with that of the comparative example.

TABLE 3

| Item | Unit | Comparative example | Embodiment |
|---|---|---|---|
| $M_L$ | dN · m | 0.3 | 0.2 |
| $M_H$ | dN · m | 10.2 | 11.3 |
| $\Delta M (= M_H - M_L)$ | dN · m | 9.9 | 11.1 |

Figure 7:
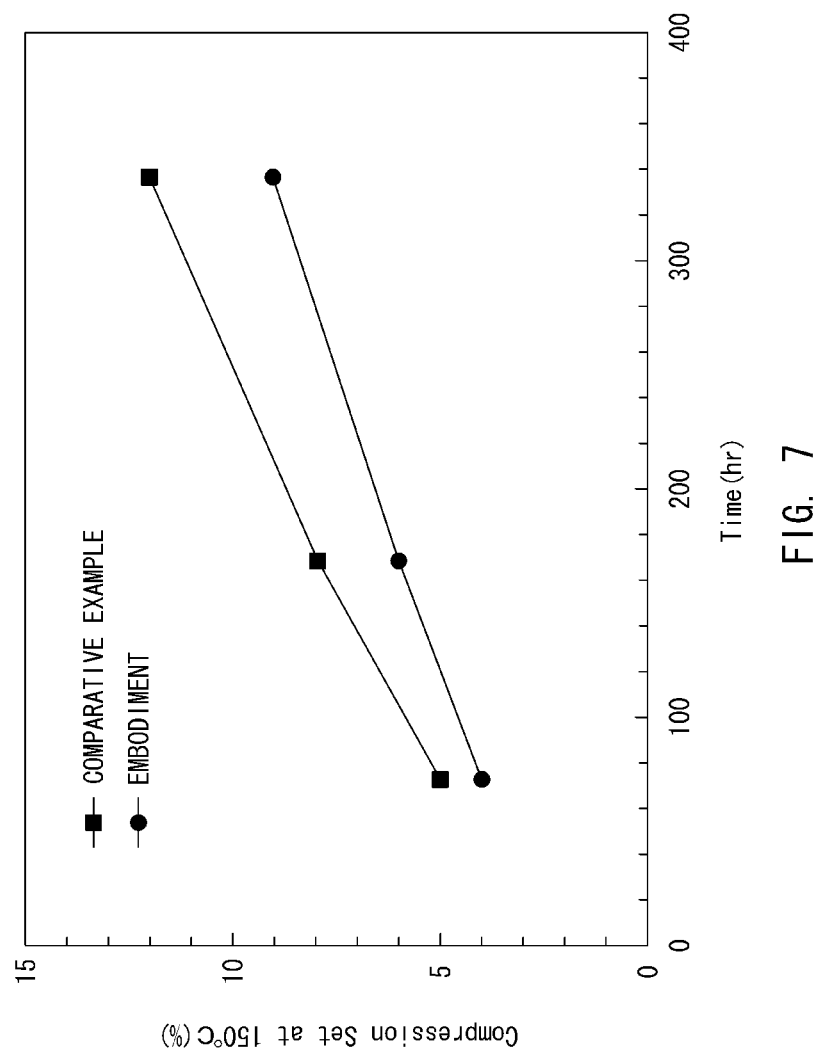
FIG. 7 is a graph showing a compression set that is measured by thermal treatment at 150° C. after a fluorine compound is cross-linked, according to an existing comparative example and an exemplary embodiment of the present invention, respectively.

In order to compare elasticity of the fluorine gasket according to the existing comparative example and the exemplary embodiment of the present invention, each compression set is measured in the above-described evaluation condition and is shown in FIG. 7 and the following Table 4.

The following Table 4 shows compression sets and compression movement properties of the fluorine compound according to the comparative example and the exemplary embodiment of the present invention.

TABLE 4

| Item | Evaluation condition[1] | | Unit | Comparative example | Embodiment |
|---|---|---|---|---|---|
| Compression set | ASTM D395: | 150° C./72 hours | % | 5 | 4 |
| | Method B | 150° C./168 hours | % | 8 | 6 |
| | 25% Deflection | 150° C./336 hours | % | 12 | 9 |
| Compressibility | [Sample thickness when 1st compression is performed (@10 MPa)/ sample thickness when 1st compression is performed (@0.3 MPa)] × 100 | | % | 76 | 76 |

[1]Measured by manufacturing the fluorine compound as a standard test sample after being cross-linked.

As shown in FIG. 7 and Table 4, the compression set according to the embodiment of the present invention is lower than the comparative example in all of the measured conditions and thus elasticity in the exemplary embodiment of the present invention is higher than the comparative example. When the fluorine compound according to the exemplary embodiment of the present invention is used in a gasket for a stack for hydrogen fuel cell vehicles, sealing durability of the stack can be increased so that long-term durability of hydrogen fuel cell vehicles can be increased.

Since the stack for hydrogen fuel cell vehicles is manufactured by stacking and assembling several hundreds of cells, as described above, it is important to understand compression behavior of the gasket when the fluorine gasket is used in the stack. In particular, in order to stably operate and maintain hydrogen fuel cell vehicles for a long time, cells of which performance is rapidly decreased as time elapses, or cells showing unexpectedly unusual behavior should be replaced or repaired. In this case, since the stack undergoes repetitive disassembly-reassembly, all cells in the stack are repeatedly compressed.

Figure 8A:
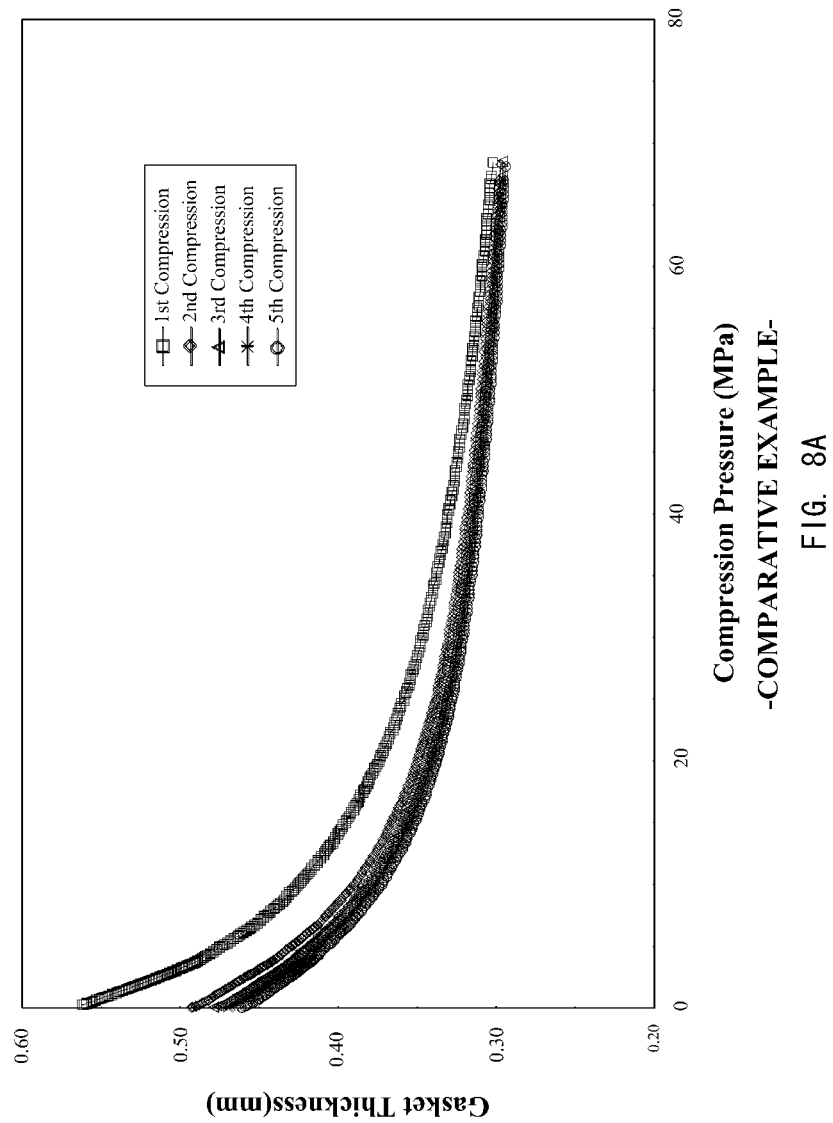
FIGS. 8A and 8B are graphs showing 5-time-repeated compression movements that are measured after fluorine compounds are crosslinked, according to an existing comparative example and an exemplary embodiment of the present invention, respectively.
Figure 8B:
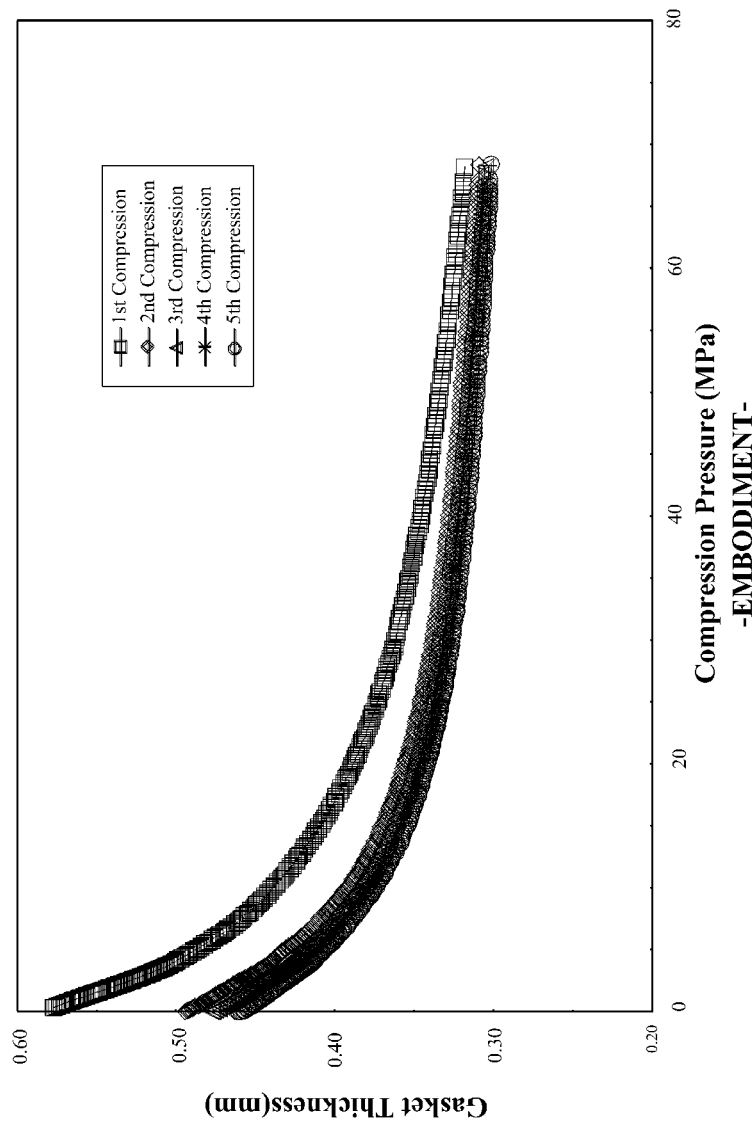

FIGS. 8A and 8B are graphs showing 5 repetitive compression behaviors that are measured after fluorine compounds are crosslinked, according to an existing comparative example and an exemplary embodiment of the present invention, respectively. Thus, in order to understand compression behavior of the gasket when such repetitive compression is performed, after fluorine compounds according to an existing comparative example and an exemplary embodiment of the present invention, respectively, are sufficiently cross-linked, the fluorine compounds are repeatedly compressed five times, and their thickness variations are measured and compared, as shown in FIGS. 8A and 8B. As shown in the measurement results of the comparative example of FIG. 8A and the exemplary embodiment of FIG. 8B, repetitive compression behaviors in the comparative example and the embodiment of the present invention are almost the same.

In addition, in order to compare compressibility of samples, ratios at which a sample thickness under compression pressure about 10 MPa when 1st compression is performed is divided by a sample thickness under compression pressure about 0.3 MPa, are compared so that compressibility of each sample according to the comparative example and the embodiment of the present invention is about 76% and is the same.

In general, compressibility from about 65% to 85% is preferable. When compressibility is less than 65%, an excessive compression problem of stack occurs so that durability may be lowered. When compressibility exceeds about 85%, compression is not easily performed so that proper stack assembly cannot be performed and proper contact resistance cannot be obtained.

As a result, the gasket according to the exemplary embodiment of the present invention has proper compressibility. This means that, when the gasket is manufactured based on the fluorine compound according to the embodiment of the present invention, an injection molding processability and elasticity can be increased compared to the existing comparative example and when a stack is assembled, the same compression conditions as in the existing comparative example can be used so that compatibility is high.

Electrochemical Cell Performance and Contact Resistance of Stack

In order to compare the effect of fluorine gaskets according to an existing comparative example and an embodiment of the present invention on electrochemical cell performance and contact resistance of a hydrogen fuel cell, 5-cell stacks were manufactured in the above-described conditions and their performances were compared. The results of the electrochemical cell performances of the 5-cell stacks of the comparative example and an embodiment of the present invention are shown in FIG. 9.

Figure 9:
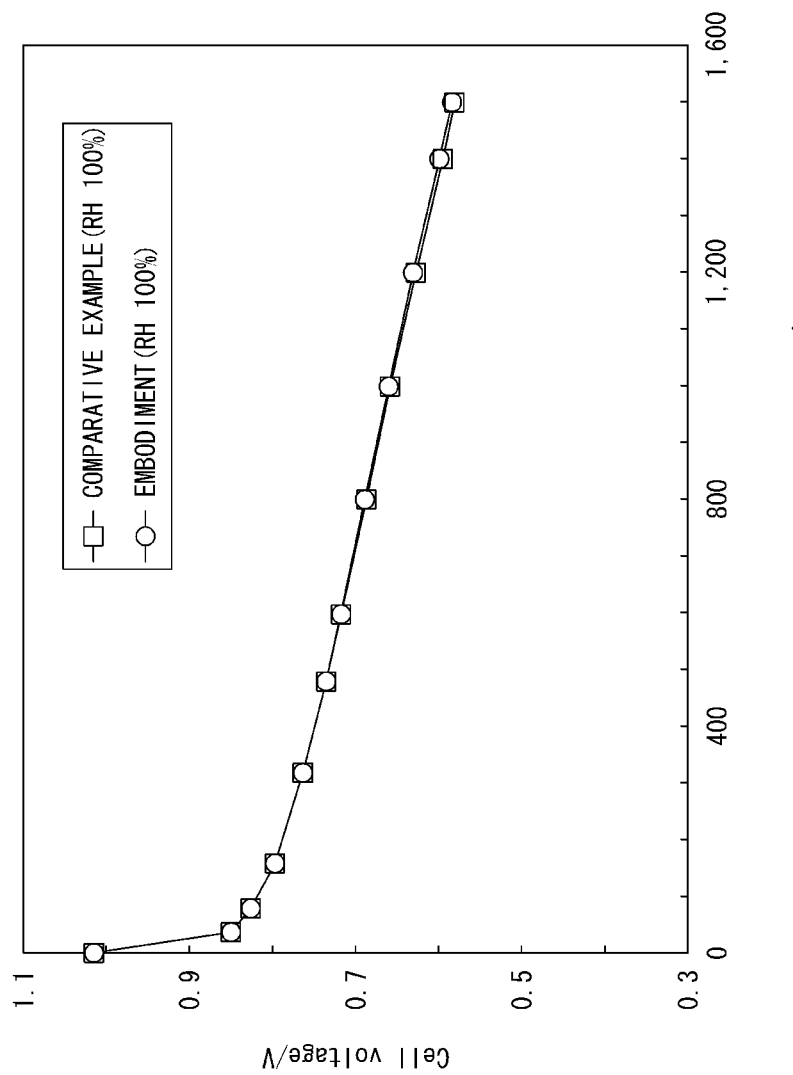
FIG. 9 is a graph showing an electrochemical cell performance of a 5-cell stack using an integrated gasket manufactured by injection molding, according to an existing comparative example and an exemplary embodiment of the present invention, respectively.
Figure 10:
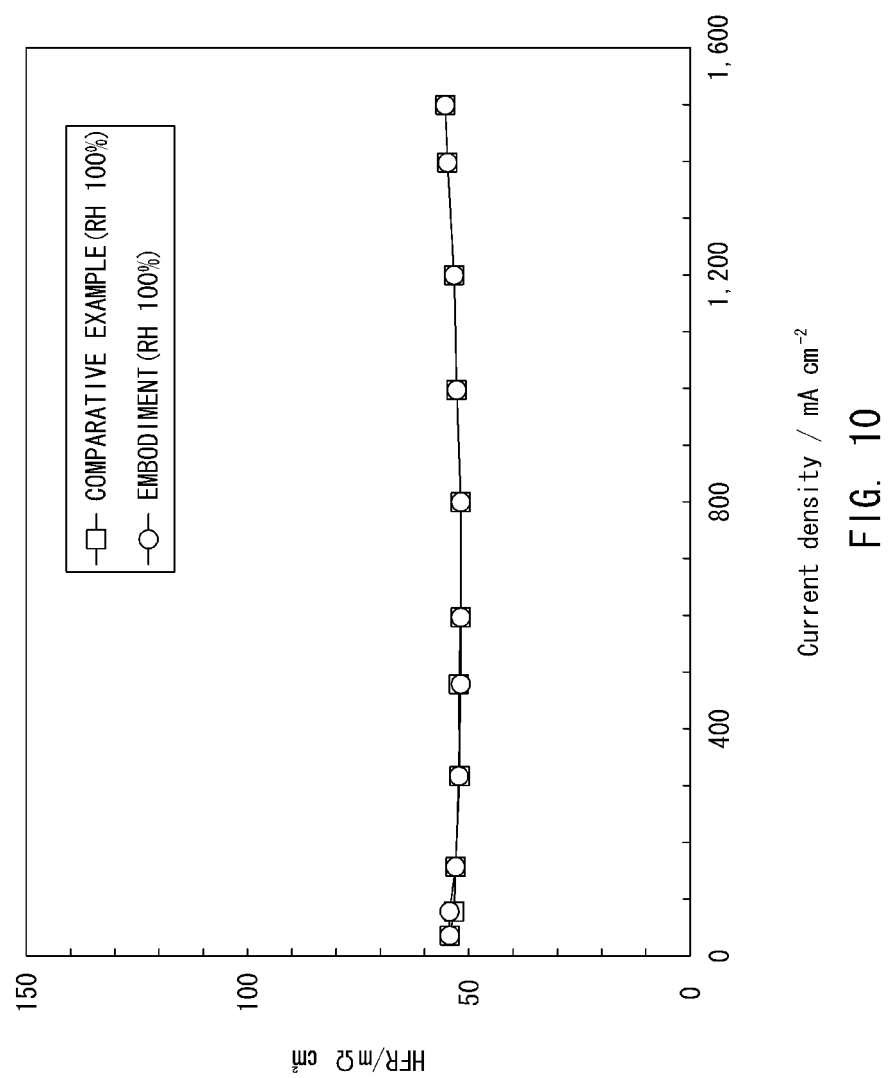
FIG. 10 is a graph showing high-frequency resistance (HFR) of a 5-cell stack using an integrated gasket manufactured by injection molding, according to an existing comparative example and an exemplary embodiment of the present invention, respectively.

As shown in FIG. 9, the same cell performances are observed at all measured current densities in both the comparative example and the exemplary embodiment of the present invention. FIG. 10 is a graph showing high-frequency resistance of 5-cell stacks using integrated gaskets manufactured by injection molding, according to an existing comparative example and an exemplary embodiment of the present invention, respectively.

As illustrated in FIG. 10, the same high-frequency resistances are shown at all measured current densities in both the comparative example and the exemplary embodiment of the present invention so that contact resistances of two stacks are the same.

When comparing the cell performances shown in FIGS. 9 and 10, a gasket prepared by using a fluorine compound according to the embodiment of the present invention is found to have much better injection molding processability (which enables precise injection molding and reduces the percentage of poor molding) and lower compression set (which results in higher elasticity) relative to the comparative example, while maintaining the same excellent electrochemical performance and contact resistance of the stack according to the comparative example.

As described above, the present invention provides the following effects:

In a fluorine gasket for hydrogen fuel cells according to the present invention in which a high fluidity/high elasticity fluorine compound for hydrogen fuel cells is integrated with a bipolar plate by injection molding on the bipolar plate, Mooney viscosity is lower than an existing fluorine compound so that fluidity is enhanced, and a scorch time of the fluorine compound is increased to prevent pre-curing. Thus, an injection molding processability can be greatly improved and simultaneously, a low compression set causes a further increase in elasticity so that sealing durability of a stack can be increased.

When a fluorine gasket according to the present invention is used in a fuel cell stack for hydrogen fuel cells, the same repetitive compression behavior, electrochemical cell performance and contact resistance characteristics as an existing fluorine gasket are shown with the above-described advantages so that a fuel cell stack can be stably used in the same stack assembly condition and the same operation condition without changing existing conditions.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An integrated fluorine gasket manufactured by injection molding for hydrogen fuel cells, wherein the integrated fluorine gasket comprises a fluorine compound and a thin bipolar plate, wherein the thin bipolar plate has a thickness of about 200 μm or less, wherein the fluorine compound is injection molded on the thin bipolar plate and first cross-linked, wherein the integrated fluorine gasket has a thickness of about 750 μm or less, wherein the fluorine compound comprising a fluoroelastomer has a fluorine content of about 60 to 75 parts by weight based on 100 parts by weight of the fluoroelastomer, wherein the fluorine compound has Mooney viscosity of about 10 to 24 in a condition of ISO 289-1(2005): ML(1+4)/125° C., and wherein the fluorine compound has a scorch time of about 1.7 to 3.0 minutes that is measured by using a moving die rheometer (MDR) based on ISO 6502:1999(E) in a condition of temperature about 185° C./oscillation amplitude 0.5°/time 10 minutes.

2. The integrated fluorine gasket of claim 1, wherein, the fluorine compound is secondly post-cross-linked at a temperature of at least 200° C.

3. The integrated fluorine gasket of claim 1, wherein the fluorine compound has shore A hardness of about 35 to 65 in a condition of ASTM D2240.

4. The integrated fluorine gasket of claim 1, wherein the fluorine compound has about a 90% cure time of about 3.5 to 5.0 minutes that is measured by using a moving die rheometer (MDR) based on ISO 6502:1999(E) in a condition of temperature 185° C./oscillation amplitude 0.5°/time 10 minutes.

5. The integrated fluorine gasket of claim 1, wherein the fluorine compound has ΔM of at least 10.5 dN·m that is a difference between highest torque and minimum torque by using a moving die rheometer (MDR) based on ISO 6502:1999(E) in a condition of temperature 185° C./oscillation amplitude 0.5°/time 10 minutes.

6. The integrated fluorine gasket of claim 1, wherein the fluorine compound has a filling percentage of spider mold flow of 75% or more by using a 1.6 mm-sprue in a condition of temperature 180° C./pressure 6 MPa/time 7 minutes.

7. The integrated fluorine gasket of claim 1, wherein the fluorine gasket formed from the fluorine compound on the bipolar plate has a compression set of about 4% or less as a fluorine gasket in a condition of ASTM D395 (Method B, 25% Deflection, 150° C./72 hours).

8. The integrated fluorine gasket of claim 1, wherein fluorine gasket formed from the fluorine compound on the bipolar plate has a compression set of about 9% or less as a fluorine gasket in a condition of ASTM D395 (Method B, 25% Deflection, 150° C./336 hours).

9. The integrated fluorine gasket of claim 1, wherein the fluorine gasket formed from the fluorine compound on the bipolar plate comprises a fluorine gasket in which, when a degree of deformation of the thin bipolar plate is measured in 15 positions of the thin bipolar plate by using a contour measuring device, wherein the bipolar plate has an average value of degrees of deformation of less than 60 μm.

10. The integrated fluorine gasket of claim 1, wherein the fluorine gasket formed from the fluorine compound on the bipolar plate has compressibility of about 65 to 85%.

11. The integrated fluorine gasket of claim 1, wherein the fluoroelastomer comprises binary copolymer containing vinylidene fluoride (VDF) and hexafluoropropene (HFP).

12. An integrated fluorine gasket manufactured by injection molding for hydrogen fuel cells, wherein the integrated fluorine gasket comprises a fluorine compound and a thin bipolar plate, wherein the thin bipolar plate has a thickness of about 200 μm or less, wherein the fluorine compound is injection molded on the thin bipolar plate and first cross-linked, wherein the integrated fluorine gasket has a thickness of about 750 μm or less, wherein the fluorine compound comprising a fluoroelastomer has a fluorine content of about 60 to 75 parts by weight based on 100 parts by weight of the fluoroelastomer, wherein the fluorine compound has Mooney viscosity of about 10 to 24 in a condition of ISO 289-1(2005): ML(1+4)/125° C., wherein the fluorine compound has ΔM of at least 10.5 dN·m that is a difference between highest torque and minimum torque by using a moving die rheometer (MDR) based on ISO 6502:1999(E) in a condition of temperature 185° C./oscillation amplitude 0.5°/time 10 minutes.

* * * * *